United States Patent [19]

Ortyn et al.

[11] Patent Number: 5,677,762
[45] Date of Patent: Oct. 14, 1997

[54] APPARATUS FOR ILLUMINATION STABILIZATION AND HOMOGENIZATION

[75] Inventors: William E. Ortyn, Devall; Jon W. Hayenga; Louis R. Piloco, both of Kent, all of Wash.

[73] Assignee: NeoPath, Inc., Redmond, Wash.

[21] Appl. No.: 650,048

[22] Filed: May 16, 1996

Related U.S. Application Data

[63] Continuation of Ser. No. 309,064, Sep. 20, 1994, abandoned.

[51] Int. Cl.⁶ ................................................. G01N 21/84
[52] U.S. Cl. ................................... 356/39; 356/443
[58] Field of Search .......................... 356/39, 435, 432, 356/443

[56] References Cited

U.S. PATENT DOCUMENTS

| | | |
|---|---|---|
| 3,729,252 | 4/1973 | Nelson . |
| 3,824,393 | 7/1974 | Brain . |
| 4,093,991 | 6/1978 | Christie, Jr. et al. . |
| 4,175,860 | 11/1979 | Bacus . |
| 4,391,494 | 7/1983 | Hershel . |
| 4,425,037 | 1/1984 | Hershel et al. . |
| 4,444,492 | 4/1984 | Lee . |
| 4,536,091 | 8/1985 | Allington ............................. 356/435 |
| 4,555,621 | 11/1985 | Buchar . |
| 4,577,964 | 3/1986 | Hansen ................................. 356/39 |
| 4,600,302 | 7/1986 | Sage, Jr. ............................... 356/39 |
| 4,649,261 | 3/1987 | Sheets . |
| 4,681,414 | 7/1987 | Hershel . |
| 4,698,486 | 10/1987 | Sheets . |
| 4,734,829 | 3/1988 | Wu et al. . |
| 4,747,030 | 5/1988 | Offner et al. . |

(List continued on next page.)

OTHER PUBLICATIONS

Born, Max et al., *Principles of Optics: Electromagnetic Theory of Propagation Interference and Diffraction of Light*, 6th Edition, Pergamon Press, Copyright ©1980, pp. 224–225. (no month).

Iwasaki, Kenji et al., "Design Ideas: Flattening Laserbeam Intensity Distribution", *Lasers & Applications*, p. 76, Apr. 1983.

O'Shea Donald, *Elements of Modern Optical Design*, Copyright ©1985 by John Wiley & Sons, Inc., pp. 111–115. (no month).

Bacus, James W. and Les J. Grace, "Optical Microscope System For Standardized Cell Measurements and Analyses", *Applied Optics*, 26:16, pp. 3280–3293, 15 Aug. 1987.

Bartels, Peter H. et al., "A Self-Learning Computer Program for Cell Recognition", *ACTA Cytologica: The Journal of Clinical Cytology*, 14:8, pp. 486–494, Oct. 1970.

Tanaka, Noboru et al., "Automated Cytologic Screening System (CYBEST Model 4): an Integrated Image Cytometry System", Reprinted from *Applied Optics*, vol. 26, No. 16, pp. 3301–3307, Aug. 15, 1987. Copyright © 1987 by the Optical Society of America.

*Primary Examiner*—Richard A. Rosenberger
*Attorney, Agent, or Firm*—Hans I. Sun; Emil Moffa

[57] ABSTRACT

An illumination device provides temporally, spatially and angularly stable illumination for microscopic evaluations. An arc lamp serves as the light source. An input optical train gathers and focuses the light through an aperture stop to place an image of the arc incident on an input aperture of a light pipe. The magnification of the arc lamp is chosen to reduce the variation due to occlusion. The light pipe spatially homogenizes the light while preserving the angular integrity. An exit window may be placed over the exit aperture of the light pipe to keep dust and debris out of focus. Another optical train receives the spatially homogenized, angularly preserved light and may focus a many arclet images to fill the pupil of a condenser lens. The condenser lens also may focus the exit aperture of the light pipe onto or near the specimen on a microscope slide. A feedback system samples the light and corrects for residual temporal variations by electronically modifying the image as it leaves a CCD. A neutral density filter controls the overall energy passed through the system.

21 Claims, 10 Drawing Sheets

U.S. PATENT DOCUMENTS

| | | |
|---|---|---|
| 4,750,837 | 6/1988 | Gifford et al. . |
| 4,802,768 | 2/1989 | Gifford et al. . |
| 4,823,043 | 4/1989 | Roberts et al. . |
| 4,883,333 | 11/1989 | Yanez . |
| 4,965,725 | 10/1990 | Rutenberg . |
| 5,050,946 | 9/1991 | Hathaway et al. . |
| 5,088,816 | 2/1992 | Tomioka et al. .......................... 356/39 |
| 5,103,385 | 4/1992 | Federico et al. . |
| 5,109,465 | 4/1992 | Klopotek . |
| 5,202,950 | 4/1993 | Arego et al. . |
| 5,215,370 | 6/1993 | Kaplan . |
| 5,218,660 | 6/1993 | Omata . |
| 5,257,182 | 10/1993 | Luck et al. . |
| 5,287,272 | 2/1994 | Rutenberg et al. . |
| 5,315,700 | 5/1994 | Johnston et al. . |
| 5,361,140 | 11/1994 | Hayenga et al. . |

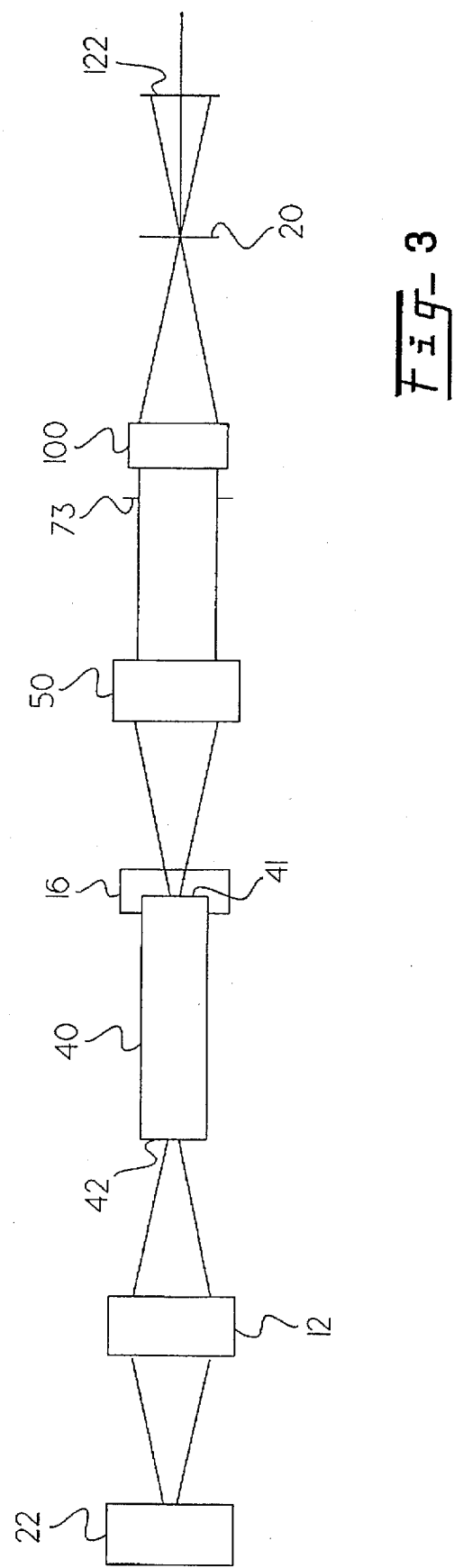

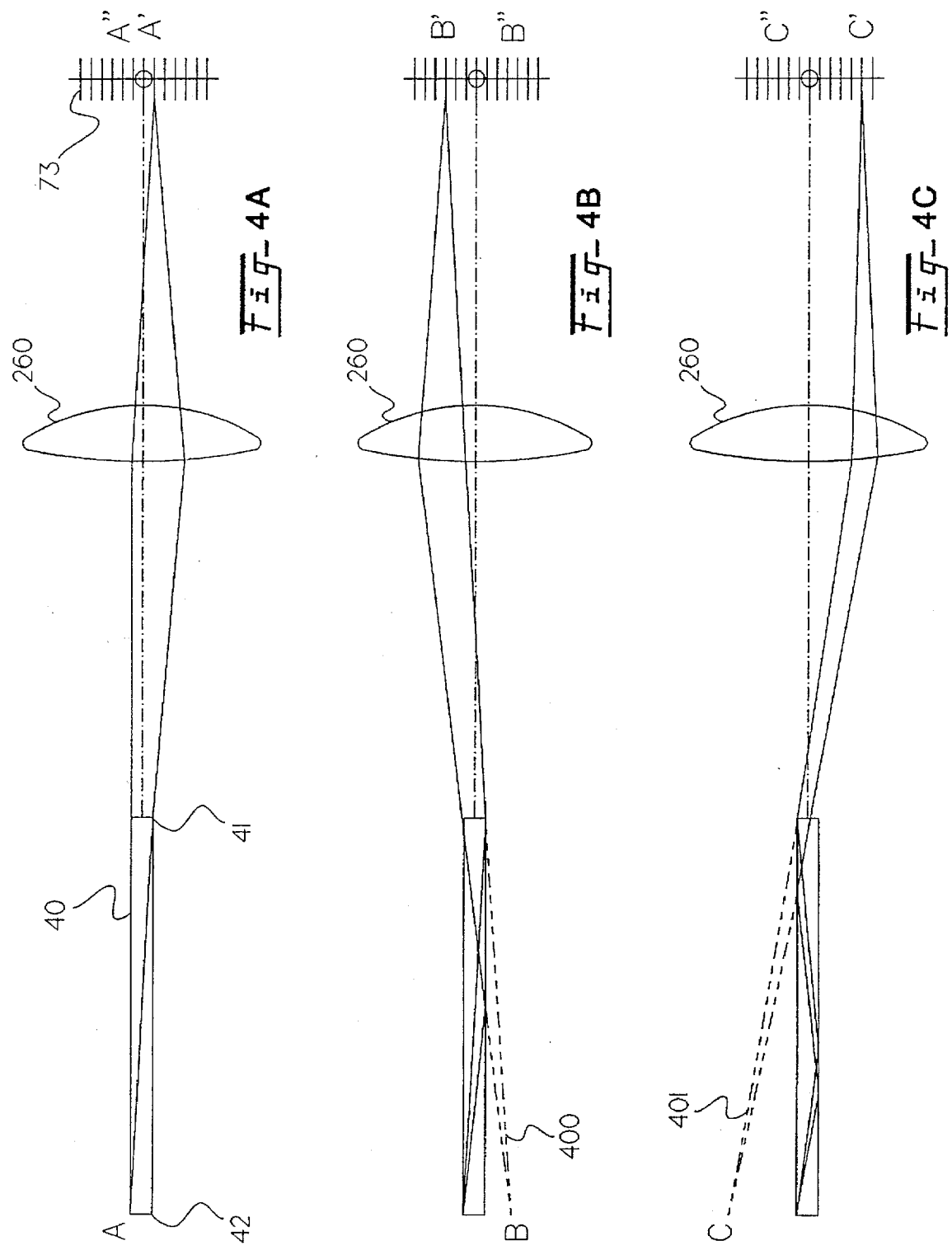

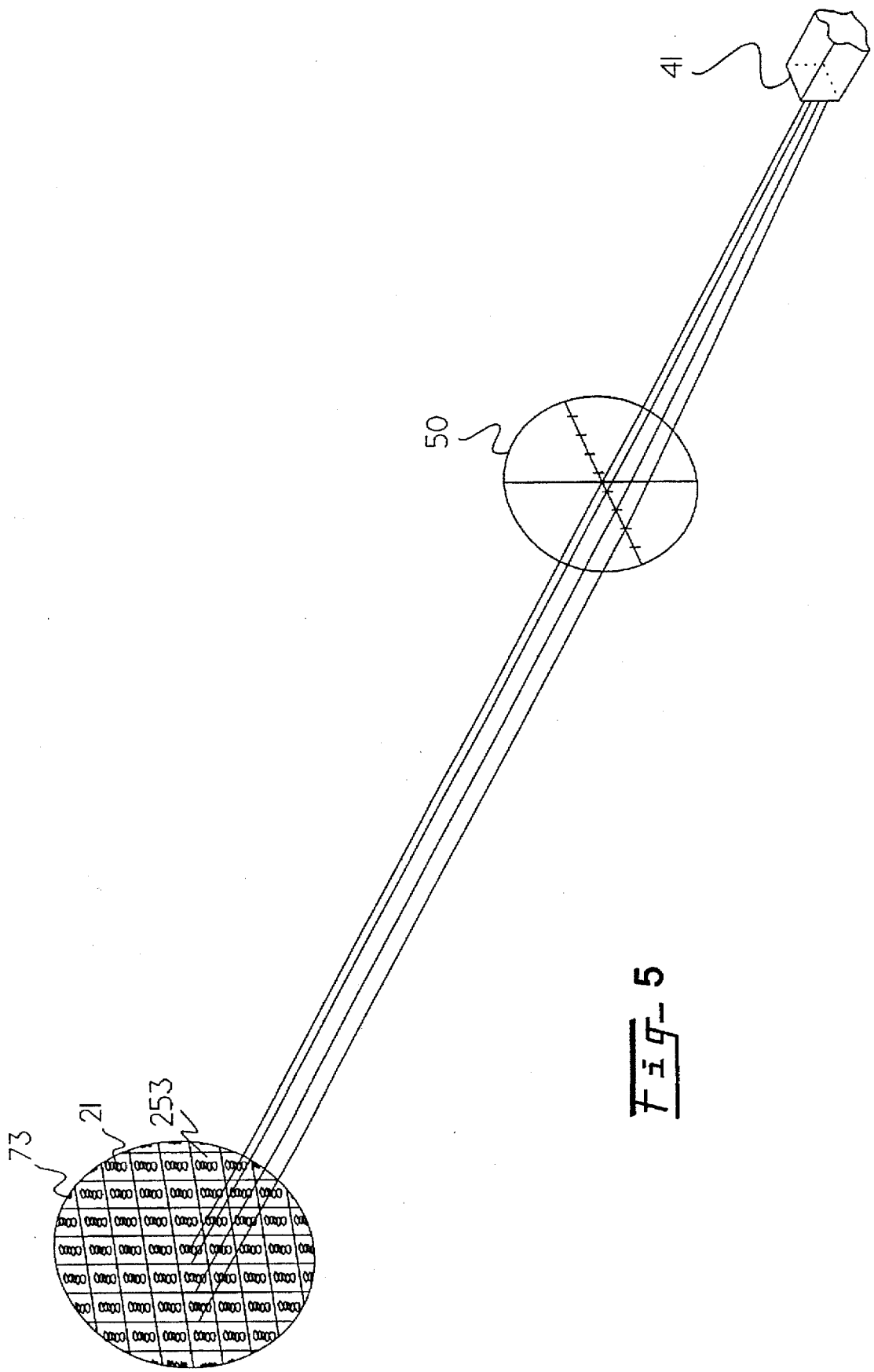

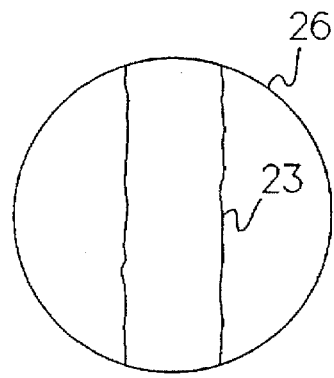
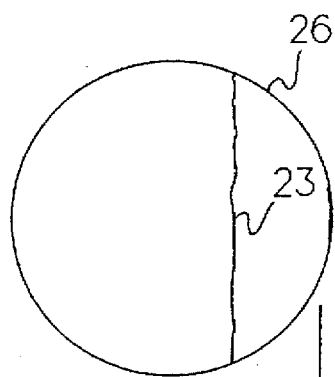
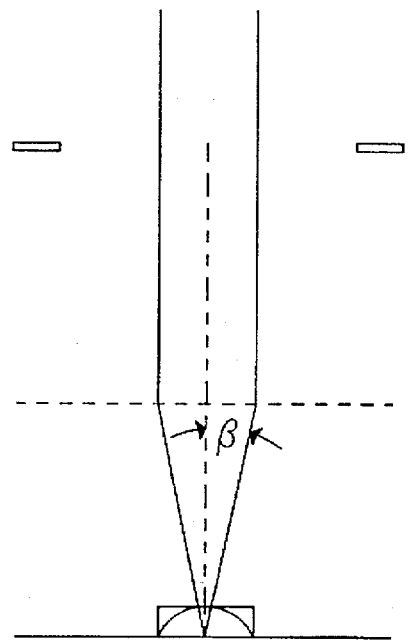
Fig_6A
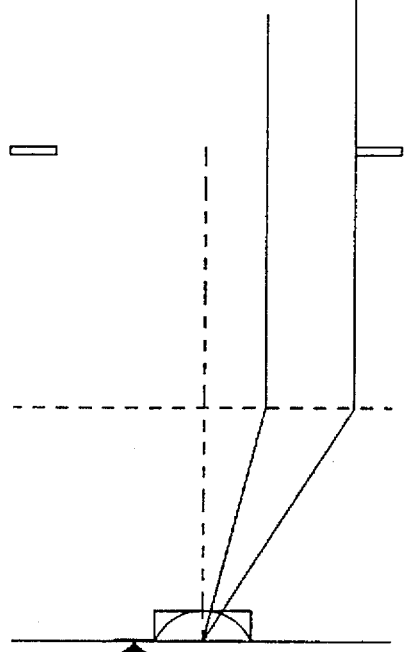
SHADOW
Fig_6B

APPARATUS FOR ILLUMINATION STABILIZATION AND HOMOGENIZATION

This is a continuation of application Ser. No. 08/309,064, filed on Sep. 20, 1994, now abandoned.

FIELD OF THE INVENTION

The invention relates to a method and apparatus to provide temporally and spatially invariant illumination of a microscope slide mounted cytological specimen and more particularly, to a method and apparatus that minimizes variations in global illuminance, static field intensity, dynamic field intensity and angular field intensity while illuminating a microscope slide mounted specimen.

BACKGROUND OF THE INVENTION

The automated analysis of a biological specimen requires a high degree of spatial and temporal uniformity in specimen illumination for accurate and repeatable evaluation. Those evaluations often measure photometric properties such as nuclear and cytoplasm density. In order to accurately and repeatably measure these properties, the illumination must maintain a high degree of uniformity across the field of view and from collected image to collected image. In addition, morphological operations are conducted to segment various objects in the field of view for further analysis. This analysis determines various feature values related to size, shape and frequency content etc. Further, these objects tend to be three dimensional in nature and therefore can be affected by shadowing, dependent on the angular characteristics of the illumination. Operations used in analyses of such objects tend to exhibit nonlinear behavior due to various thresholding schemes that may be employed. Therefore, accurate and repeatable behavior of these processing methods also necessitates a high degree of spatial and angular uniformity across the field of view and from collected image to collected image.

Lack of illumination uniformity due to factors such as spatial intensity variations in the light source, physical movement of the source, variations in slide thickness and dust and debris that occlude the optical surfaces of the illuminator may lead to erroneous and varying results produced by automated cytological instruments.

For automated cytology applications, a pulsed mercury or xenon arc lamp was used to because of high brightness and low pulse duration. The low pulse duration effectively freezes images in motion with little or no blur. These systems are typically referred to as "flash on the fly" systems. Although the pulsed arc lamp has advantageous features for use in automated pap smear analysis, it also has detrimental features including a highly nonuniform spatial intensity profile, a variation in overall energy output from flash to flash and an undesirable spatial movement of the arc from flash to flash. These detriments render the arc ineffective in its natural form for use in illumination of pap smears.

Prior art methods have employed Kohler illumination techniques for the purpose of generating uniform illumination of microscope specimens by creating a magnified image of a source, preferably an arc, onto the aperture of a condenser lens. See, for example, Born and Wolf, *Principles of Optics*, pp. 524–525, Pergamon Press Inc., 1980 or O'Shea, *Elements of Modern Optical Design*, pp. 111–114, John Wiley and Sons Inc., 1985.

The typical Kohler technique as shown in FIG. 8, the arc 23, is imaged with a magnification of twenty times by a lens system 220, onto the aperture 73 of the condenser lens 70. Even with this relatively large magnification the arc image 210 may only fill the aperture 73 in one axis. The other axis is either left filled with an intensity distribution that is highly nonuniform or left underfilled. A condition resulting from this configuration is an axis dependent resolving power of the total system due to a differential numeric aperture in each axis. This is shown in FIGS. 9A and 9B. Note that the angles defining the numeric apertures, phi and beta, are different in each axis due to underfill. As the arc moves laterally from flash to flash, two more problems arise. The first, a variation in angular field intensity, causes shading to occur. This is due to the non-uniform intensity profile in the pupil as shown in FIGS. 6A and 6B. As the arc moves between successive flashes on the same object, shadowing, sometimes called shading, can occur and result in the same object appearing differently from each flash. The second problem resulting from this configuration is the global illumination variation caused by the arc wander. It is easy to see in FIG. 8 that as the arc moves laterally the aperture occludes more or less of the arc depending on the position of the arc relative the aperture. Variation in occlusion of the arc causes a variation in energy throughput to the specimen from flash to flash. This variation is referred to as global illumination variation.

Automated cytology systems, unlike other automated vision systems may have a variation in spatial uniformity due to substrate thickness variation. In practice, the substrate, or microscope slide thicknesses can vary by as much as 0.9 millimeters (mm). As the microscope slide is introduced into the optical path, it becomes part of the optical apparatus for illuminating the specimen. A variation in thickness of this element may have an effect on the axial position of the optical stops of the system, in particular, the field stop or detector plane. When the slide thickness varies, the location of the detector, as imaged in the illumination train, tends to move along the optic axis. It often happens, that this movement of the detector plane falls onto one or more element surfaces in the illumination train. This causes two problems. First, dust or defects in those surfaces to be imaged onto the detector, thereby creating artifacts in the image plane and degrading the image of the specimen. Those skilled in the art can appreciate that a thickness variation of 0.9 mm in a glass substrate creates roughly a 0.3 mm difference in the optical path. Those skilled in the art will also appreciate that a high magnification of the source used to fill the aperture of the condenser may cause a 0.3 mm variation in optical path, in object space, to be amplified by the square of the magnification to produce a substantial axial shift in image space of objects imaged in the illumination train. This shift can be on the order of 100 mm depending on the magnifications used. This can easily place the detector image onto numerous surfaces in the illuminator and thereby cause debris or flaws on those surfaces to appear as if they were part of the specimen. Those skilled in the art will also appreciate that an axial shift of this magnitude may create vignetting of one or more elements in the illuminator which can serve to cause a drop off in intensity in the object plane. This intensity drop is a variation in static field intensity. The effects of differing substrate thickness and the effects of arc wander can combine to cause the same field of view to vary in static and angular intensity depending on where the arc is imaged and which substrate is being used. This is known as a dynamic field intensity variation.

Therefore, in consideration of the problems associated with illumination in the automated analysis of pap smears, it is a motive of this invention to provide illumination of uniform global, static, angular and dynamic intensity.

SUMMARY OF THE INVENTION

The invention provides a microscope illumination apparatus comprising a light source for providing light energy and a light pipe for maintaining the angular nature of the light energy while scrambling the spatial characteristics. The light pipe, having rectangular cross section and an input and output aperture, wherein the input aperture is located to receive an image of the light source and the output aperture provides spatially homogeneous light to the microscope. The invention further provides an aperture stop for passing light of a predetermined area around the optic axis to control the angular content of the light input to the light pipe. An attenuator positioned along the axis near the input of the light pipe receives light passing through the aperture stop, wherein, the attenuator may be calibrated to pass a predetermined proportion of the light to control the overall amount of energy passing through light pipe. A beam splitter is positioned to receive the spatially homogenous light to split the homogenous light into a first beam and second beam wherein the second beam provides light to the specimen for microscopic evaluation. A detector is positioned to receive the first beam for providing a detected signal indicative of the second beam intensity. The automated microscope may use the detected signal to adjust for the illumination variations of the light source. Alternatively, a running average of detected signals may be obtained and the illumination level may be adjusted based on the running average.

The illumination apparatus of the present invention reduces the problem of angular field intensity variation by employing a light pipe to provide a multitude of arclet images which are then imaged on or near the aperture of a condenser lens. The arclet images may be minified with respect to the actual arc size. Each alternate arclet is a mirror image of the arclet next to it. Therefore, as the primary arc moves in a given direction, the arc images associated with it move in accordance. However, the mirror imaged arcs move in the opposite direction. The invention reduces angular intensity variation by the use of mirror imaging of arclets and minification of arc movement at the condenser aperture.

It is an object of the invention to reduce the problem of global illumination variation by imaging the arc on the input aperture of the light pipe in such a way as to underfill that aperture; thereby, allowing arc movement without occlusion. In addition, an on-the-fly adjustment to the specimen image is made based on the detector signal indicative of the specimen illumination level. These features of the invention serve to reduce the problem of global intensity variation.

It is a further object of the invention to reduce static field intensity variation by imaging the output aperture of the light pipe on or near the specimen. The light pipe scrambles the spatial integrity of the intensity pattern at its input and provides for a constant intensity profile at its output while maintaining angular integrity.

It is another object of the invention to provide for uniform intensity over a variation in slide thickness. The light pipe is sized to overfill the field stop, or camera, and used to generate a plurality of arclets to fill the aperture of the condenser lens. Therefore, a low magnification illuminator is designed to use the light pipe; thereby, decreasing effective movement of the field stop as the substrate, or microscope slide, thickness changes. This reduces the potential for vignetting of optical elements in the illuminator which may cause intensity drop off, or static field variation at the object plane. Further, over sizing of the light pipe prevents intensity drop off by accommodating any residual movement of the field stop.

It is yet another object of the invention to reduce the problem of dust, debris that may fall on the surface of the light pipe from being imaged onto the specimen. The output aperture of the light pipe is guarded by an exit window which is placed over the output aperture. The exit window is substantially far enough away from the output end to keep dust and debris out of focus.

It is still another object of the invention to reduce problem of surface flaws, dust and debris that may be present on other optical surfaces of the illuminator from being imaged onto the specimen. The low magnification illuminator is designed with all field images located substantially far from elements surfaces to prevent flaws on those surfaces from affecting illumination uniformity.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIG. 3 shows an alternate embodiment of the illumination apparatus of the invention.

FIGS. 4A, 4B and 4C show a schematic of the light pipe.

FIG. 5 shows a schematic of the light pipe generating a plurality of arclets of light.

FIGS. 6A and 6B show the effect of underfill on light intensity stability.

DETAILED DESCRIPTION OF THE PREFERRED EMBODIMENT

Figure 1:
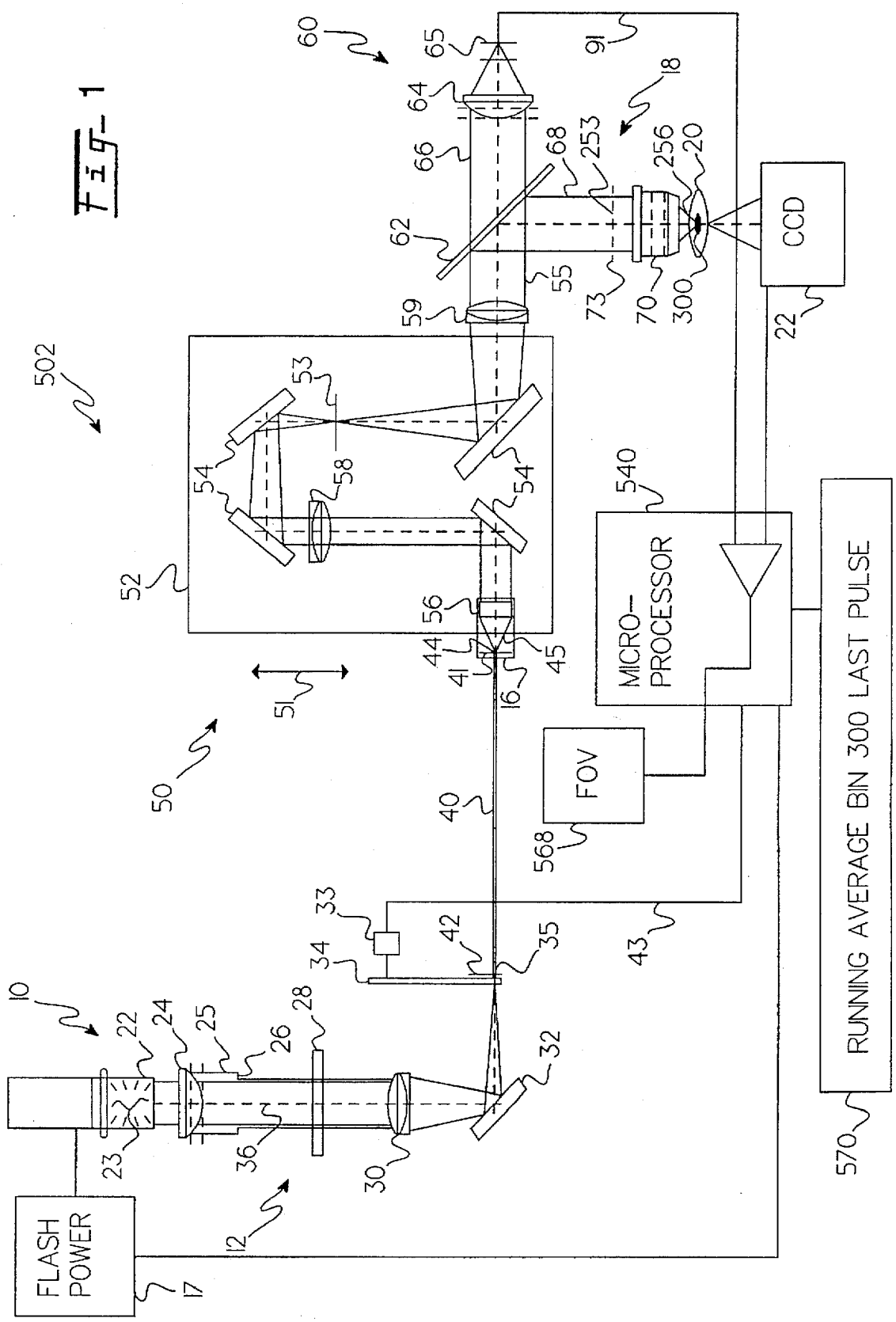
FIG. 1 shows a schematic of the illumination apparatus of the invention used for a 4× magnification.

In a presently preferred embodiment of the invention, the system disclosed herein is used in a system for analyzing cervical pap smears, such as that shown and disclosed in pending U.S. patent application Ser. No. 08/571,686, filed Dec. 13, 1995, which is a file wrapper continuation of abandoned U.S. patent application Ser. No. 07/838,064, entitled "Method For Identifying Normal Biomedical Specimens", by Alan C. Nelson et al., filed Feb. 18, 1992; U.S. Pat. No. 5,528,703 which is a continuation in part of abandoned U.S. patent application Ser. No. 07/838,395, entitled "Method For Identifying Objects Using Data Processing Techniques", by S. James Lee et al., filed Feb. 18, 1992; U.S. Pat. No. 5,315,700, entitled "Method And Apparatus For Rapidly Processing Data Sequences", by Richard S. Johnston et al., U.S. Pat. No. 5,361,140 entitled "Method and Apparatus for Dynamic Correction of Microscopic Image Signals" by Jon W. Hayenga et al.; and allowed U.S. patent application Ser. No. 08/302,355, filed Sep. 7, 1994 entitled "Method and Apparatus for Rapid Capture of Focused Microscopic Images" to Hayenga et al., which is a continuation-in-part of abandoned U.S. patent application Ser. No. 07/838,063 filed on Feb. 18, 1992 the disclosures of which are incorporated herein, in their entirety, by the foregoing references thereto.

The present invention is also related to biological and cytological systems as described in the following patent applications which are assigned to the same assignee as the present invention, filed on even date herewith, and which are all hereby incorporated by reference including pending U.S. patent application Ser. No. 08/309,118, filed Sep. 20, 1994, to Kuan et al. entitled, "Field Prioritization Apparatus and Method," pending U.S. patent application Ser. No. 08/309,061, filed Sep. 20, 1994, to Wilhelm et al., entitled "Apparatus for Automated Identification of Cell Groupings on a Biological Specimen," pending U.S. patent application Ser. No. 08/309,116, filed Sep. 20, 1994 to Meyer et al. entitled "Apparatus for Automated Identification of Thick Cell Groupings on a Biological Specimen," pending U.S. patent application Ser. No. 08/667,292, filed Jun. 20, 1996, which is a file wrapper continuation of abandoned U.S. patent application Ser. No. 08/309,115 to Lee et al. entitled "Biological Analysis System Self Calibration Apparatus," pending U.S. patent application Ser. No. 08/678,124, filed Jul. 11, 1996, which is a file wrapper continuation of abandoned U.S. patent application Ser. No. 08/308,992 to Lee et al. entitled "Apparatus for Identification and Integration of Multiple Cell Patterns," pending U.S. patent application Ser. No. 08/309,063, for which the issue fee has been paid, to Lee et al. entitled "A Method for Cytological System Dynamic Normalization," pending U.S. patent application Ser. No. 08/309,248, filed Sep. 20, 1994, for which the issue fee has been paid, to Rosenlof et al. entitled "Method and Apparatus for Detecting a Microscope Slide Coverslip," U.S. Pat. No. 5,566,249 to Rosenlof et al. entitled "Apparatus for Detecting Bubbles in Coverslip Adhesive," pending U.S. patent application Ser. No. 08/309,931, filed Sep. 20, 1994, to Lee et al. entitled "Cytological Slide Scoring Apparatus," pending U.S. patent application Ser. No. 08/309,148, filed Sep. 20, 1994, to Lee et al. entitled "Method and Apparatus for Image Plane Modulation Pattern Recognition", pending U.S. patent application Ser. No. 08/309,250, filed Sep. 20, 1994, to Lee et al. entitled "Apparatus for the Identification of Free-Lying Cells," pending U.S. patent application Ser. No. 08/309,209, filed Sep. 20, 1994 to Oh et al. entitled "A Method and Apparatus for Robust Biological Specimen Classification," pending U.S. patent application Ser. No. 08/309,117, filed Sep. 20, 1994, to Wilhelm et al. entitled "Method and Apparatus for Detection of Unsuitable Conditions for Automated Cytology Scoring."

The present invention is also related to biological and cytological systems as described in the following patent applications which are assigned to the same assignee as the present invention, filed on Sep. 20, 1994 unless otherwise noted, and which are all hereby incorporated by reference including U.S. patent application Ser. No. 08/309,118, to Kuan et al. entitled, "Field Prioritization Apparatus and Method," U.S. patent application Ser. No. 08/309,061, to Wilhelm et al., entitled "Apparatus for Automated Identification of Cell Groupings on a Biological Specimen," U.S. patent application Ser. No. 08/309,116 to Meyer et al. entitled "Apparatus for Automated Identification of Thick Cell Groupings on a Biological Specimen," U.S. patent application Ser. No. 08/309,115 to Lee et al. entitled "Biological Analysis System Self Calibration Apparatus," U.S. patent application Ser. No. 08/308,992, to Lee et al. entitled "Apparatus for Identification and Integration of Multiple Cell Patterns," U.S. patent application Ser. No. 08/309,063 to Lee et al. entitled "A Method for Cytological System Dynamic Normalization," U.S. patent application Ser. No. 08/309,248 to Rosenlof et al. entitled "Method and Apparatus for Detecting a Microscope Slide Coverslip," U.S. patent application Ser. No. 08/309,077 to Rosenlof et al. entitled "Apparatus for Detecting Bubbles in Coverslip Adhesive," U.S. patent application Ser. No. 08/309,931, to Lee et al. entitled "Cytological Slide Scoring Apparatus," U.S. patent application Ser. No. 08/309,148 to Lee et al. entitled "Method and Apparatus for Image Plane Modulation Pattern Recognition," U.S. patent application Ser. No. 08/309,250 to Lee et al. entitled "Apparatus for the Identification of Free-Lying Cells," U.S. patent application Ser. No. 08/309,209 to Oh et al. entitled "A Method and Apparatus for Robust Biological Specimen Classification," U.S. patent application Ser. No. 08/309,117, to Wilhelm et al. entitled "Method and Apparatus for Detection of Unsuitable Conditions for Automated Cytology Scoring."

It is to be understood that the various processes described herein may be implemented in software suitable for running on a digital processor. The software may be embedded, for example, in the central processor 540.

Now refer to FIG. 1 which shows a schematic representation of the one embodiment of the invention. The illumination device of the invention comprises a light 10, an optical conditioning system 12, a light pipe 40, a mechanical slide 52 with elements 54 and 56 positioned in place to intercept the light leaving the light pipe 40, and condenser optics 18. This configuration of the device provides for illumination suitable for 4× magnification of biological specimens 300 on a microscope slide 20.

The optical conditioning system 12 includes, a collimator lens 24, an aperture stop 26, a bandpass filter 28, a condenser lens 30, a turning mirror 32 and a neutral density filter 34. The optical elements of the optical conditioning system 12, except for the neutral density wedge 34 are positioned along optical axis 36.

Light 10 comprises a light source 22 and flash power unit 17. The light source 22 is positioned to provide illumination to the collimator lens 34. In one preferred embodiment, high intensity arc lamp 22 serves as the light source 22. Typically the arc 23 in an arc lamp 22 is not stable and tends to move from flash to flash causing illumination variation.

The optical conditioning system 12 includes a collimator lens 24 of focal length 29.5 mm, an aperture stop 26, a bandpass filter 28, an arc imaging lens 30 with focal length of 100 mm, a turning mirror 32 and a neutral density filter 34. The arc lamp 22 is positioned to provide illumination to the collimator lens 24. The collimator serves to gather light from the lamp 22 and concentrate it into beam 25. This beam is directed towards and overfills an aperture stop 26. The collimator lens 24 is positioned along axis 36 between the light source 22 and the aperture stop 26. The collimator lens 24 directs the light beam 25 through the aperture stop 26. The aperture stop 26 is chosen so that the light beam 25 will overfill the aperture stop 26.

The beam then passes through a spectral bandpass filter 28 with a passband of 10 nm centered on 570 nm. These filter characteristics are chosen to provide the maximum contrast between the nucleus and cytoplasm for specimens stained with the Papanicolaou stain. Other filters may be used depending on specimen characteristics.

The neutral density filter 34 may be positioned orthogonal to the light beam 25. The neutral density filter 34 has a control input and regulates the transmission of light beam 25 passed through the neutral density filter 34 according to a control signal 43, providing an attenuated light beam 35. The control signal 43 may be provided during calibration of the light 10. The neutral density filter 34 in one embodiment is comprised of a disk having a clear area in a pie shaped section. The remainder of the disk varies linearly in density in a radial direction from 0.0 optical density to 3.0 optical density. Optical density is related to transmission in the following way where T is transmission and OD is optical density.

$$OD=\log(1/T)$$

The filter is attached to a drive motor 33 for the purpose of changing its rotation to pass either more or less light depending on the needs of the system. The neutral density filter 34, NDF 34, is located in the proximity (2 mm) of the input aperture 42 because the transmission across the NDF 34 varies radially around the NDF 34. Since the transmission varies across the NDF 34, placing the NDF 34 after the homogenizer 40 would provide either arclets 21 across the aperture that vary in intensity or an illumination field that varies in intensity at the slide 20. Likewise, placing the NDF 34 before the input aperture will result in an illumination whose intensity is dependent on angle. The homogenizer conserves the angular distribution of the light so it will not have a corrective effect on the angular distribution of the light. Placing the NDF 34 after the homogenizer may either create spatial or angular intensity variations or combinations of both. The light pipe 40 homogenizes this variation.

The light beam 25 provided by an arc lamp 22 may vary due to aging, variation in the amount of energy, and other causes. When light beam 25 provides an excess of light intensity, the neutral density filter 34 may be rotated such that a less transmissive optical region may be used. When the light beam 25 provides a lesser amount of light intensity, a more optically transmissive region may be used. In one preferred embodiment of the invention, the neutral density filter 34 provides variable transmittance that changes at a continuous rate.

The beam then passes through the lens element 30 which creates an image of the arc lamp 35 at a 3× magnification at a distance of 100 mm from the lens element 30. This image is conjugate with the input aperture 42 of the light pipe 40. However, before reaching the light pipe 40, the beam passes through a neutral density filter and is deviated 90 degrees by a turning mirror 32. Those skilled in the art will appreciate the mirror 32 provides for a designed footprint and that other configurations are possible without deviating from the scope of the invention. The aperture stop 26 in conjunction with the lens elements 24 and 30 limit the input numeric aperture into the light pipe 40 to NA 0.13. Lenses 24 and 30 in combination provide a 3:1 magnification of the arc 23 at the input of the light pipe 40. The magnified image 35 of the arc is roughly 1.8 mm at the input aperture to the light pipe 40. The input aperture 42 is square with a 2.6 mm side dimension. These dimensions were chosen to underfill the input aperture to the light pipe 40 to allow for lateral movement of the arc without causing obscuration leading to light loss. This reduces global illumination variation. Those skilled in the art will appreciate other ratios of underfill can be used without deviating from the scope of the invention.

Light pipe 40 has an input aperture 42 and an output aperture 41. Light entering the light pipe 40 at the input aperture 42 travels in a direction along the optic axis reflecting off the walls until it exits at point 41. A pellicle 16 encapsulates the end of the light pipe 40 in a sealed and clean space. This prevents dust from landing on the output aperture 41 and being imaged onto the specimen 300. The pellicle 16 is positioned far enough beyond the aperture 41 to keep dust that may fall on it, out of focus at the specimen 300. The lens 56, with a focal length is positioned to collimate the output beam of the light pipe 40 originating at the output aperture 41. Additionally, the lens 56 images the input aperture 42 of the light pipe 40 at a point roughly 21.6 mm beyond the principle plane of the lens 56. This point is roughly 1 mm beyond the turning mirror 54. The lens 58 with a focal length of 100 mm accepts the collimated light beam from lens 56 and creates an image 53 of the output aperture 41. The path is deviated twice by 90 degrees with two turning mirrors 54. Lens 58 also serves to collimate the input aperture image 35. The beam is again deviated 90 degrees by a turning mirror 54 to be accepted by a lens 59. Lens 59 with a focal length of 100 mm is positioned along the axis to collimate the image 53 of the output aperture 41. At the same time, lens 59 forms an image 253 of the input aperture 42 at a point roughly 100 mm beyond the principal plane of the lens 59. The image 253 is comprised of a plurality of arclet images formed by the interaction of the light pipe 40 and the previously disclosed elements.

A beam splitter 62 with a 70:30 reflection to transmission ratio intercepts the beam allowing 30% of the incident light to pass through. Seventy percent of the light is deviated 90 degrees to allow the image 253 to be formed in the vicinity of the pupil 73 of the condenser lens 70. The condenser lens 70, with a focal length of 20 mm, forms a secondary image 256 of the exit aperture 41 conjugate with the specimen plane 300. Light forming this image first passes through the microscope slide 20. The image 256 is 2.6 mm on a side with a numeric aperture of 0.13. In the preferred embodiment, the output aperture 41 of the light pipe 40 serves as the field stop for the illumination system. This stop is oversized by 2 times with respect to the CCD image on the slide. This accounts for any residual movement of the slide 20 as imaged into the illuminator that may occur as the slide thickness changes. This prevents vignetting which causes illumination drop-off at the edges of the field due to the absence of a full cone angle of illumination at the edge of the output aperture 41. This feature if the design minimizes variation of the static field intensity due to any residual movement of the field stop image caused by slide thickness variation.

Slide 20 is illuminated by a number of arclets of light 21. Each arclet 21 is schematically illustrated in more detail in FIG. 5. The condenser lens 70 provides uniform illumination of the specimen 300 by focusing the arclets 21 at infinity or near infinity while imaging the output aperture on to the specimen. The strobe sensor receives light by means of beam splitter 62 positioned in the path between lens 59 and aperture 73. The 70/30 RT beam splitter 62 provides strobe sensor 65 with 30% of the arclet image through a spherical lens 64. Strobe sensor 65 is conjugate with the specimen field. A spherical lens 64 is sized to receive the full lateral and angular extent of the arclet illumination. The sensor 67 provides a signal indicative of the illumination level at the specimen 300. Therefore, this signal 91 can be used to adjust the signal from the CCD 512 to mitigate any residual global illumination variation that was not mitigated by the underfill of input aperture 42.

Thirty-five mm from beam splitter 62 is the principal plane of lens 59. Lens 59 images the arclets 21 at the aperture stop 73 and culminates the image from the output aperture 41. The output aperture 41 of light homogenizer 40 also acts as a field stop and is encapsulated by pellicle 16 to prevent dust and debris from being imaged onto the slide 20. Because dust and debris is prevented from falling on output aperture 41, lenses 59 and 70 combine to provide a 5-to-1 magnification of the output aperture 41 of the light pipe 40. In one preferred embodiment, the field stop may be 2.6 mm on a slide to match the CCD camera size. The output aperture 41 is oversized as compared to the CCD image on the slide. This prevents vignetting which causes illumination drop off at the edges due to absence of a full cone angle at the edge of the output aperture 41.

Figure 2:
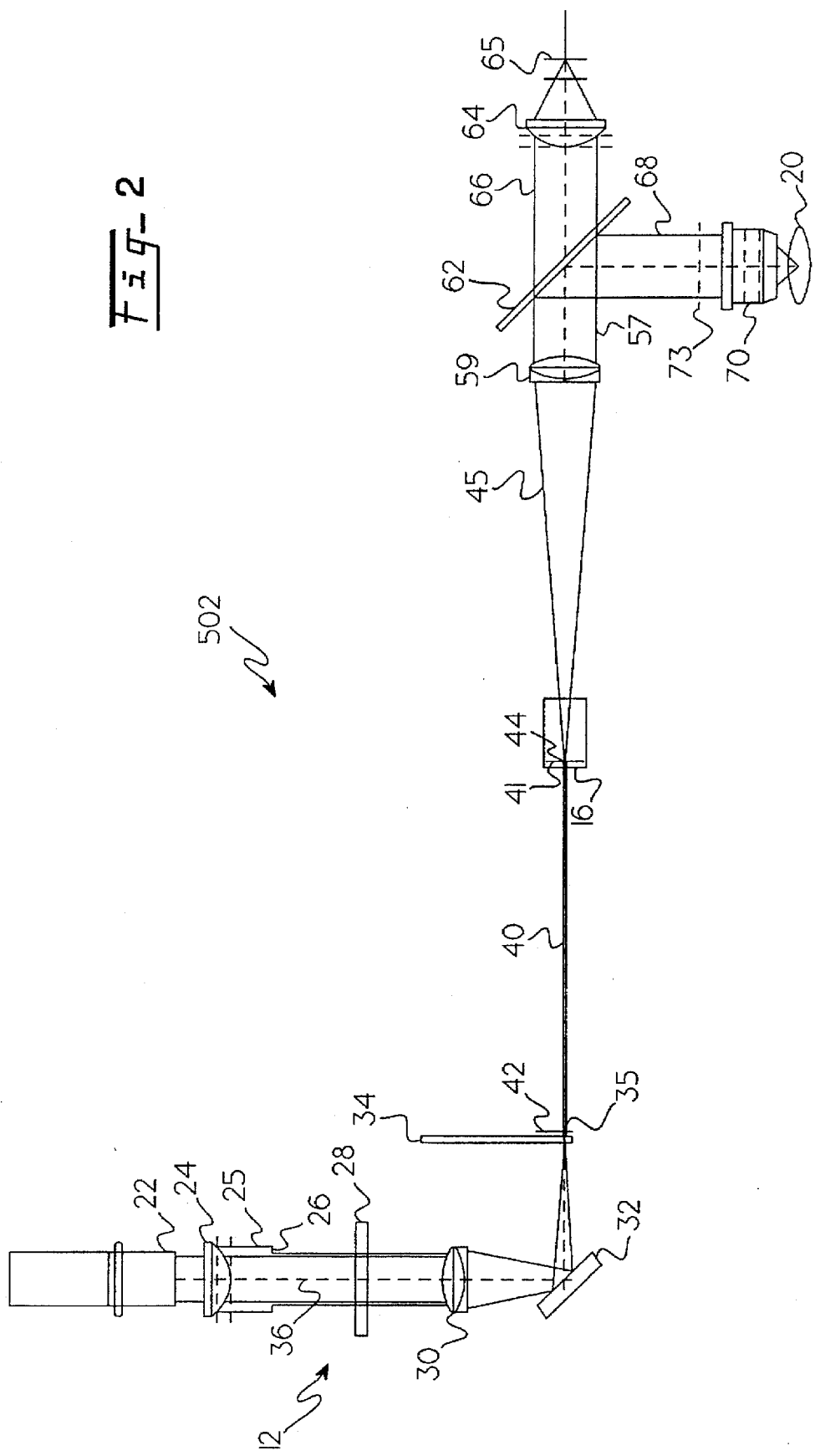
FIG. 2 shows a schematic of the illumination apparatus of the invention used for a 20× magnification.

Refer now to FIG. 2 which shows one alternate embodiment of the invention suitable for 20× microscopic illumination. In this embodiment the mechanical slide 52 is positioned to allow light to freely pass to the lens element 59. The position of lens element 59 is chosen to collimate the output of the light pipe 40 for the light beam emanating from the output aperture 41 when the mechanical slide is positioned to remove the elements 56 and 54 from the optical path. The lens element 59 also images the input aperture 42 of the light pipe 40 in the vicinity of the pupil 73 of the condenser lens 70. The condenser lens 70 with a focal length of 20 mm creates an image 256 of the output aperture 41 on the specimen 300. This image is provides for a field of illumination that is 0.52 mm on a side with an NA 0.60. However, the pupil of the condenser lens in the 20× case is set to 0.45 NA. This coupled with a Numeric Aperture of the imaging objective of 0.75 serves to maximize the contrast of the frequencies of interest in the specimen.

Now refer to FIG. 3 which shows an alternate schematic diagram of one embodiment of the apparatus of the invention to provide uniform illumination of the specimen 300. A light source 22 illuminates an optical conditioning system 12 with light. The optical conditioning system 12 provides a light bundle of a predetermined numeric aperture, predetermined spectral frequency bandpass, and predetermined intensity to the light pipe 40. The optical conditioning system 12 underfills the input of the light pipe 40. The light pipe 40 provides a light bundle of homogenized spatial content to a transport optical system 50. The transport optical system 50 collimates the output aperture 41 of the light pipe 40 while imaging the input aperture 42 of the light pipe 40 near the pupil 73 of condenser lens system 100. Imaging of the input end provides a plurality of images of the input aperture 42 of the light pipe 40 due to internal reflections in the light pipe 40 with a primary image of the input aperture 42 centered on the optical axis. The plurality of images fill the input of pupil 73 of the condenser lens system 100. The condenser lens system 100 images the collimated light corresponding to the output aperture 41 onto the specimen 300. An optical sensor 122 receives an image of the specimen 300 that has been uniformly illuminated.

Now refer to FIGS. 4A, 4B, 4C, 4D and 5 which show the operation of the light pipe 40 to generate arclets 21 and homogenize an input light pattern. The light pipe 40 is a solid glass parallel-piped, preferable made of BK7. All six surfaces of the parallel piped are polished to optical smoothness. The aspect ratio of the light pipe 40 of the in one embodiment is 100:1 with a side dimension of 2.6 mm. Other aspect ratios may be chosen without deviating from the scope of the invention. Given an extreme ray angle defined by the numeric aperture of 0.13, those skilled in the art will appreciate that over eight reflections of the extreme ray occur inside the light pipe 40. The reflections follow the laws of total internal reflection and therefore are practically lossless.

Figure 4D:
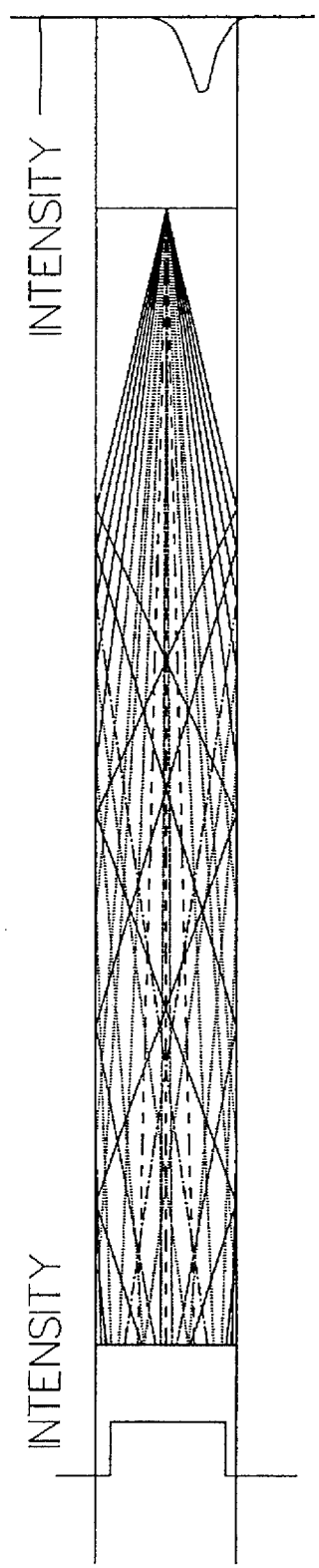
FIG. 4D shows the homogenization effect for a single point of light with only three passes of the extreme ray.

FIG. 4D demonstrates the homogenization effect for a single point of light with only three passes of the extreme ray. Note the output intensity profile is uniform relative to the input intensity profile. FIGS. 4A, 4B and 4C show the effect of the light pipe 40 coupled with a lens 260 to generate arclet images A', B' and C' from a point A in the primary input aperture 42. Note, the ray fan from point A passes through the light pipe 40 without reflection and forms in image A' by lens 260. The image B' is formed by the ray fan from point A that has a ray fan defined by the following extreme rays. One extreme ray of the fan originates at point A and reflects off the side of the light pipe 40 just before it leaves the light pipe 40 at the edge of the output aperture 41. The other extreme ray defining the fan originates at point A and reflects off the light pipe 40 at a point halfway between the input and output apertures 42 and 41 respectively. If one were to trace these rays backwards in space, shown as dotted lines 400 and 401, they would intersect at a point in space originating in the same plane as the input aperture 42. They would also intersect at a point exactly one aperture width away from point A. Likewise the image C' and its complement virtual object C are formed in the same manner. Note that the images A', B' and C' are practically all at the same intensity level due to the lossless total internal reflections of the light pipe 40. Those skilled in the art will also appreciate that an additional set of images A", B" and C" etc. will also form on the opposite side of the axis from the primed images due to complementary ray fans on the other side of the optic axis.

Figure 7A:
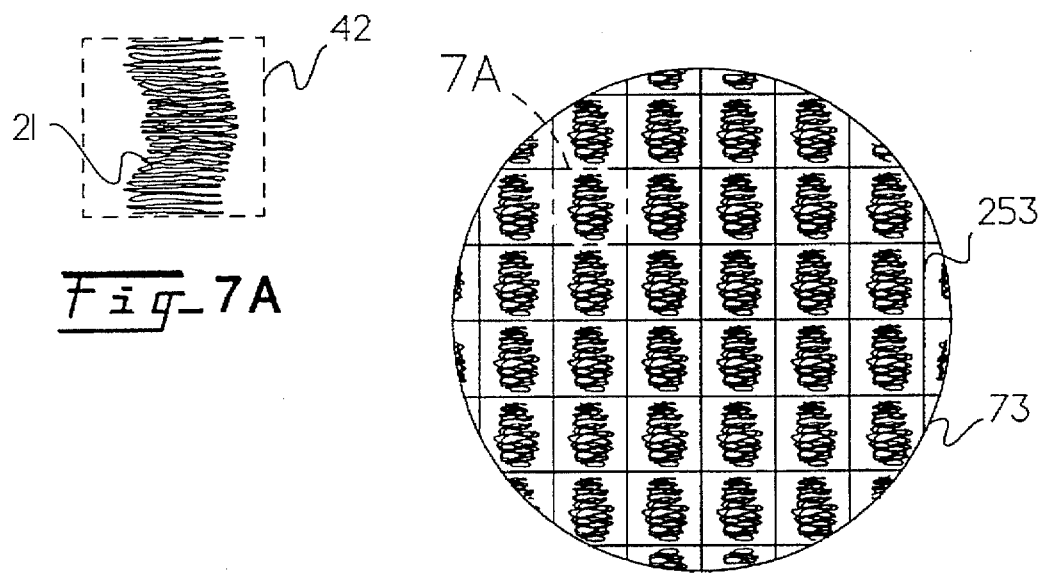
FIG. 7A shows an expanded view of arclet illumination.
Figure 7:
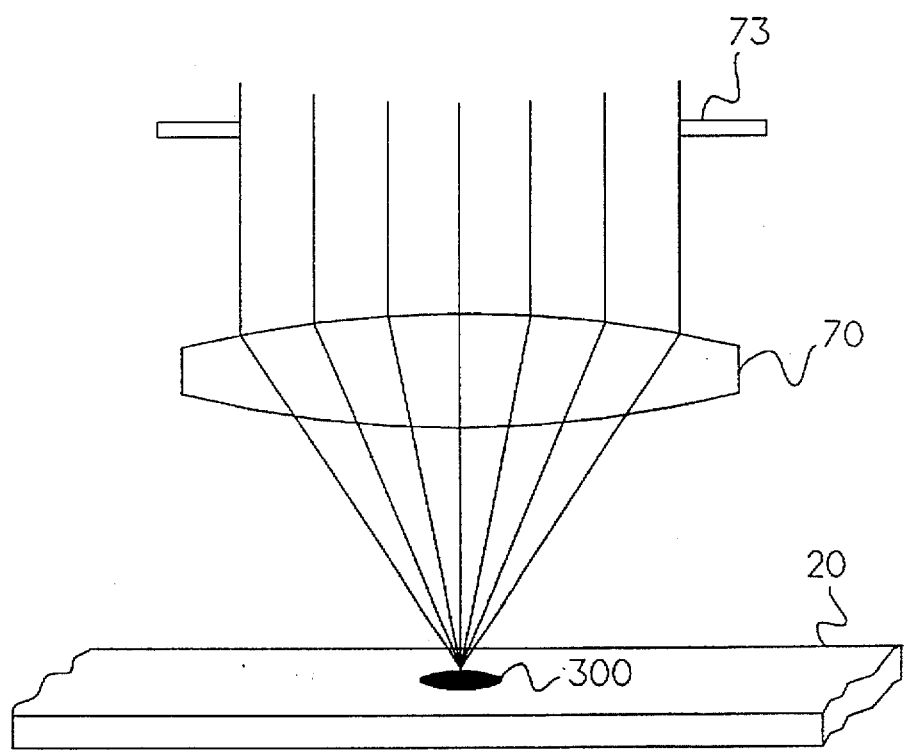
FIG. 7 shows arclet illumination of a specimen.
Figure 8:
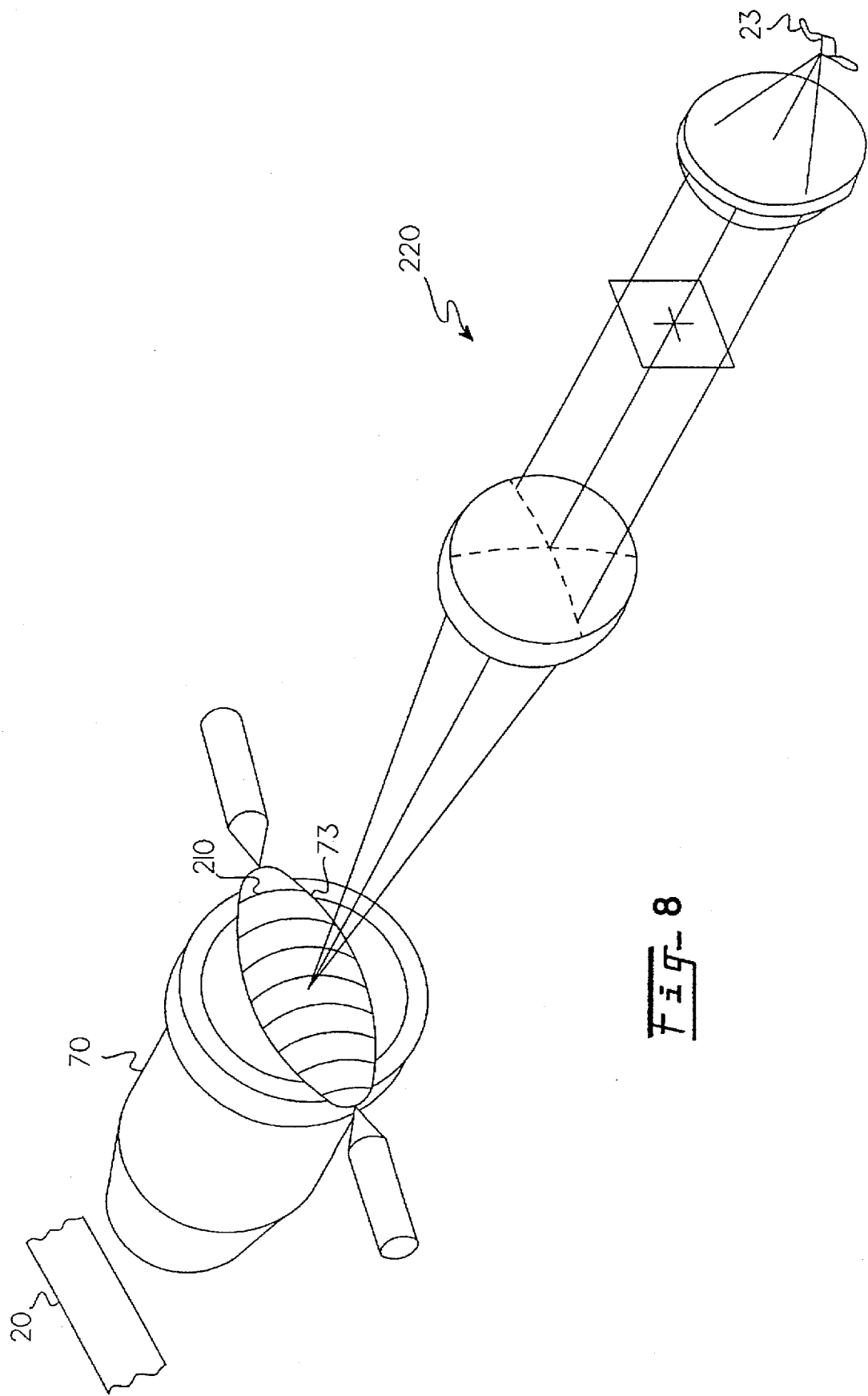
FIG. 8 shows a representation of a Kohler illumination system.
Figures 9A, 9B:
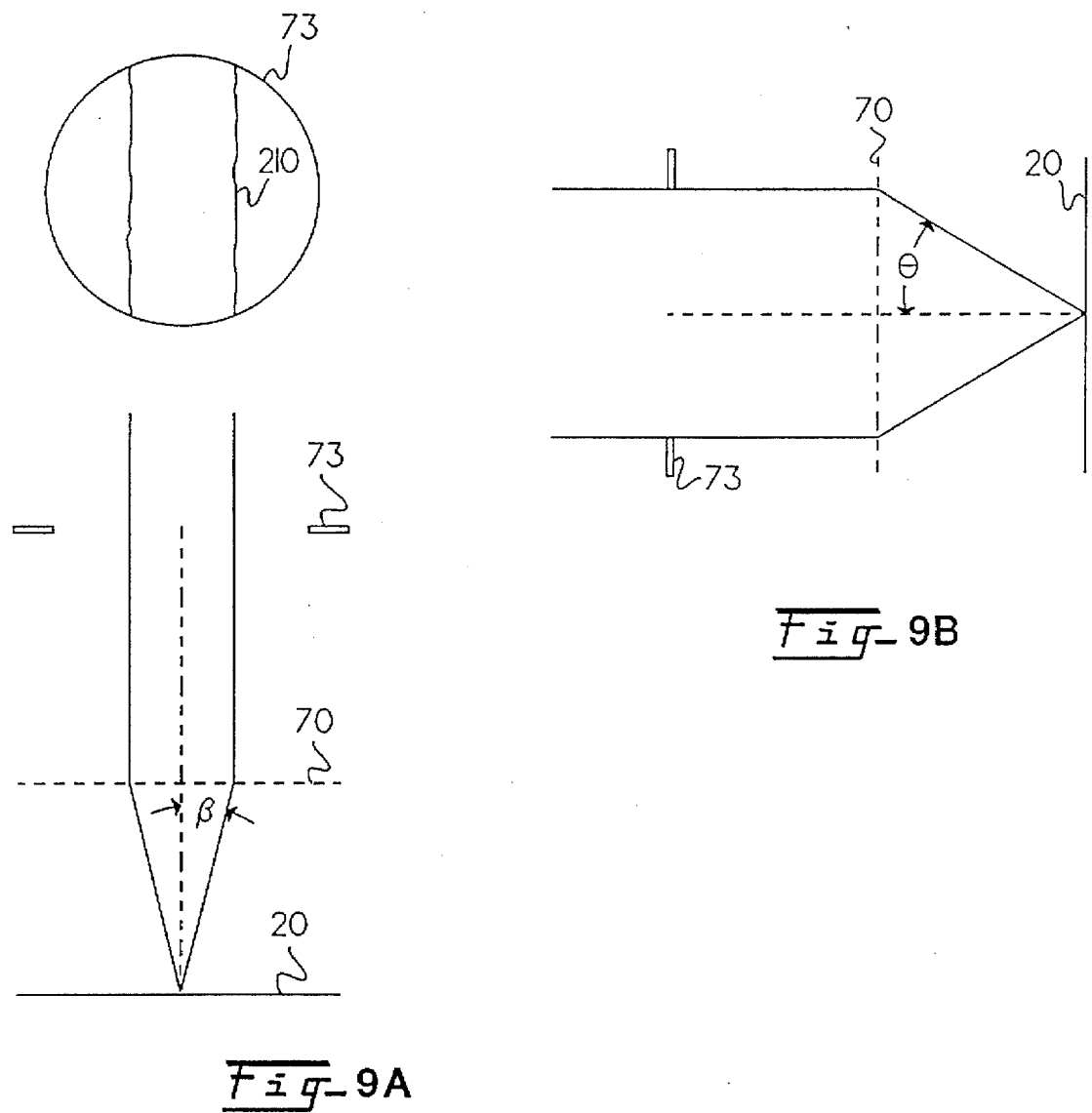
FIGS. 9A and 9B show the effects of underfill numeric aperture.

In the preferred embodiment of this invention those skilled in the art will appreciate that given the length of the light pipe 40 in combination with the input NA, approximately sixteen images, eight on each side of the optical axis, of the input aperture 42 will be formed at the condenser pupil 73. Those skilled in the art will also appreciate that the prime images A', B' and C' will move in a direction opposite in sign from the double prime images A", B" and C" as the primary arc image A moves laterally on the input aperture 42. FIG. 7 demonstrates in clearer detail the effects of imaging the arclets 21 onto the aperture 73 of the condenser lens 70. FIG. 7A shows an expanded view of arclet illumination. The specimen 300 is illuminated by a full cone angle of illumination defined by aperture 26. However, the full cone of illumination is comprised of many smaller cone angles of illumination. Each of these smaller cones has an intensity profile defined by the intensity profile of the arc image 35. Since each individual arclet only covers a small area of the condenser aperture, movement of the arc only creates a small change in the angular intensity seen by the specimen 300. Further, each nearest neighboring arclet moves in the opposite direction, thereby, mitigating the effects of its neighbor. Therefore, this invention minimizes angular intensity variation. This provides for a mitigation of the effects of shading due to arc movement at the input aperture 42.

FIG. 5 shows a perspective drawing of the plurality of arclet images filling the input pupil of the condenser by means of the light pipe 40 and the lens system 260. Those skilled in the art will appreciate that other combinations of the NA and length can be constructed and will not deviate from the scope of the invention.

Refer now to FIG. 1, in one embodiment of the invention input aperture 42 is 250 mm behind output aperture 41. Arc 23 is imaged with optical conditioning system 12 such that the arc is about 1.7 mm wide and at a numeric aperture of 0.13 at input aperture 42. The light homogenizer 40 provides a spatially uniform light distribution at exit aperture 41. The light homogenizer 40 spatially scrambles entering light while maintaining the angular integrity to provide a uniform light distribution at the output. The total internal reflection of the light homogenizer 40 provides the arclets 21 by creating a multitude of arc images in a virtual plane located at the input aperture of the light homogenizer 40. Thus, it appears that there are multiple sources of the arc distributed in space. Each arclet is reduced in intensity and, because of total internal reflection, each are about the same intensity. The uniformity is due to the radial radiation pattern from the arc being uniform in all directions. Each arclet represents a small proportion of the total cone angle.

The output aperture 41 is imaged by lens 59 close to aperture 73. Those skilled in the art will appreciate that the arclets 21 could be imaged at other locations in the optical train without deviating from the scope of the invention.

For the 4× system doublet 56 and 58 provides a uniformly illuminated field on slide 20 that is 2.6 mm on a side at a numeric aperture of 0.13. For the 20× system, the aperture 73 is 18 mm, and for the 4× system, the aperture 73 is 5.2 mm. Instead of a 5-1 magnification, the lens system provides a one-to-one relay of the exit aperture 41.

In one preferred embodiment, the light homogenizer 40 may have a high aspect ratio between length and cross-section, and be formed from a glass parallelepiped. The output end 44 of the light homogenizer 40 provides a spatially homogenized light output 45 while preserving angular integrity.

The illumination device 10 provides a spatially homogenized light output 45 to a transport optical system 50 to condition the homogenized output 45 for a selected magnification. The transport optical system 50 receives the spatially homogenized light output 45 from the light homogenizer 40. The transport optical system 50 includes a slide mechanism 52, a plurality of mirrors 54, an initial lens 56, a secondary lens 58, and a final lens 59, as shown in FIG. 1. The plurality of mirrors 54, the initial lens 56 and the secondary lens 58 are mounted on the slide mechanism 52. The slide mechanism 52 may be moved relative to the illumination device 10 as indicated by a double-headed arrow 51, providing for different levels of magnification of the spatially homogenized light output When the slide mechanism 52 is in the position as shown the homogenized output 45 is received by the initial lens 56. The initial lens 56 focuses the homogenized output 45 through the secondary lens 58, which provides an secondary focus, allowing the homogenized output 45 to pass through a field stop 53 and pass through the final lens 59. The plurality of mirrors 54 allows for lengthening of the optical path, while maintaining the angular integrity of the spatially homogenized light 45. The plurality of mirrors 54 also serves to direct the spatially homogenized light 45 through each lens, diverting the light through the secondary lens 58 and the field stop 53, and then back to the original path through the final lens 59, providing a first magnified output 55.

In one example embodiment, the initial lens 56 focuses the rays of the homogenized output 45 along substantially parallel paths. The secondary lens 58 focuses the homogenized output 45 at a focal point located at the position of the field stop 53. The final lens 59 focuses the homogenized output 45 back along substantially parallel paths.

When the slide mechanism 52 is moved away from the output end 44 of the light homogenizer 40, the illumination device 10 takes the configuration as shown in FIG. 2, and the spatially homogenized light output 45 may proceed directly to the final lens 59. The homogenized light output 45 passes through the final lens 59 and is transmitted as a second magnified output 57. In one preferred embodiment, the first magnified output 55 is provided for 4× magnification, and the second magnified output 57 is provided for 20× magnification.

The invention also includes a lamp correction train 60. The lamp correction train 60 includes a beam splitter 62 and a strobe sensor 67. The beam splitter 62 divides a predetermined proportion of radiation from either the first magnified output 55 or the second magnified output 57, and allows a sample output 66 to pass through and reflects a conditioned output 68. In one example embodiment, the conditioned output 68 and the sample output have a 70:30 ratio. The strobe sensor 67 is positioned to detect the sample output 66 and provides a sample signal representative of the intensity of the sample output to a lamp correction circuit. The lamp correction circuit analyzes the signal and accounts for strobe to strobe variation during microscopic analysis.

A specimen condenser 70 receives the reflected conditioned output 68 from the beam splitter 62. The specimen condenser 70 images the conditioned output 68 at the proper size and numerical aperture on the microscope slide 20.

FIGS. 6A and 6B show the effect of underfill on light intensity stability. FIG. 6A shows the arc centered in the aperture stop 26. In FIG. 6B the arc has moved to the edge of the aperture. Because magnification of the arc is chosen to underfill the aperture stop 26, this movement of the arc does not significantly affect the intensity of the light passed through the aperture stop 26. When the arc is magnified to fill the aperture stop 26, this movement of the arc would cause over half of the arc to be occluded, reducing the intensity of light passed through the aperture stop 26 by a like proportion.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An apparatus for specimen illumination of a microscope slide specimen comprising:

a) an arc lamp for providing a light;

b) a first lens positioned to image the arc lamp so as to produce an image of the arc lamp;

c) a light pipe having an input aperture and an output aperture, wherein the light pipe is positioned so that the image is located at the input aperture;

d) an attenuator positioned at the input aperture of the light pipe to receive the light, wherein the attenuator may be calibrated to pass a predetermined proportion of the light to the specimen wherein the attenuator comprises a neutral density filter including an optically clear region and an optically shaded region having an optical density wherein the optical density increases linearly; and e) a second lens and a third lens wherein the second lens is positioned to collimate light from the output aperture to image the input aperture of the light pipe in the vicinity of a pupil of the third lens wherein the third lens creates an image of the output aperture on the microscope slide to provide illumination comprising uniform spatial and angular intensity on the microscope slide specimen.

2. An apparatus for specimen illumination of a microscope slide specimen comprising:

a) an arc lamp for providing a light;

b) a first lens positioned to image the arc lamp so as to produce an image of the arc lamp;

c) a light pipe having an input aperture and an output aperture, wherein the light pipe is positioned so that the image is located at the input aperture; and d) a second lens and a third lens wherein the second lens is positioned to collimate light from the output aperture to image the input aperture of the light pipe in the vicinity of a pupil of the third lens wherein the third lens creates an image of the output aperture on the microscope slide to provide illumination comprising uniform spatial and angular intensity on the microscope slide specimen.

3. The specimen illumination apparatus of claim 2 wherein the arc lamp further comprises:

a) an aperture stop for controlling the angular content of the light input to the light pipe; and b) an attenuator positioned at the input aperture of the light pipe to receive the light, wherein the attenuator may be calibrated to pass a predetermined proportion of the light to the specimen.

4. The specimen illumination apparatus of claim 3 further comprising a collimator lens located along an axis between the arc lamp and the aperture stop for gathering the light from the arc lamp, and an arc imaging lens located between the aperture stop and the input aperture to provide a magnification such that the light underfills the input aperture.

5. The specimen illumination apparatus of claim 3 wherein the attenuator comprises a neutral density filter including an optically clear region and an optically shaded region having an optical density wherein the optical density increases linearly.

6. The specimen illumination apparatus of claim 2 further comprising a spectral filter located to receive light from the arc lamp and passing in-band-light while blocking out-of-band light.

7. The specimen illumination apparatus of claim 2 further comprising a turning mirror mounted to receive light originating from the arc lamp wherein the turning mirror diverts an optical path of the light.

8. The specimen illumination apparatus of claim 2 further comprising a correction circuit, wherein the correction circuit samples the light and provides a signal indicative of an intensity of the light.

9. The specimen illumination apparatus of claim 8 wherein the correction circuit further comprises:

a) a beam splitter positioned to receive the light for splitting the light into a first beam and a second beam wherein the second beam provides illumination for a microscopic evaluation; and b) a detector positioned to receive the first beam for providing a detected signal indicative of the second beam intensity.

10. The specimen illumination apparatus of claim 2 wherein the specimen comprises a gynecological specimen prepared by the papanicolaou method.

11. The specimen illumination apparatus of claim 2 wherein the light pipe comprises a light homogenizer having a high aspect ratio of length to cross-section.

12. The specimen illumination apparatus of claim 2 further comprising magnifying optics positioned to receive the conditioned light from the light pipe, wherein the magnifying optics include a path extension that may be used to lengthen an optical path for a selected magnification.

13. The specimen illumination apparatus of claim 12 wherein the path extension comprises a plurality of lenses and a plurality of mirrors mounted on a slide, wherein the slide may be inserted or removed from the optical path to provide for a selected magnification.

14. The specimen illumination apparatus of claim 2 further comprising specimen condenser optics for receiving the conditioned light and focusing the conditioned light at a proper size and numeric aperture on a microscope slide.

15. The specimen illumination apparatus of claim 2 wherein the third lens comprises a microscope condenser lens.

16. The specimen illumination apparatus of claim 2 further comprising a chamber having an exit window positioned over the output aperture of the light pipe, wherein the exit window is disposed to allow transmission of the conditioned light.

17. The specimen illumination apparatus of claim 16 wherein the exit window is located sufficiently far away from the output aperture of the light pipe to keep any dust or debris on the exit window out of focus.

18. A light spatial intensity homogenizing and angular intensity variation minimizing microscope slide specimen illumination apparatus comprising:

a) an arc lamp for providing a light, and wherein the arc may move substantially along an axis;

b) a first lens positioned to image the arc lamp so as to produce an image of the arc lamp;

c) a light pipe having an input aperture and an output aperture, wherein the light pipe is positioned so that the image is located at the input aperture, and wherein the image underfills the input aperture in the axis; and d) a second lens and a third lens wherein the second lens is positioned to collimate light from the output aperture to image the input aperture of the light pipe in the vicinity of a pupil of the third lens wherein the third lens creates an image of the output aperture on the microscope slide to provide illumination comprising uniform spatial and angular intensity on the microscope slide specimen.

19. The specimen illumination apparatus of claim 18 wherein the arc lamp further comprises:

a) an aperture stop for controlling the angular content of the light input to the light pipe; and b) an attenuator positioned at the input aperture of the light pipe to receive the light, wherein the attenuator may be calibrated to pass a predetermined proportion of the light to the specimen.

20. A method for providing spatially and temporally uniform light for use in microscopic evaluations comprising the steps of:

a) providing an arc light source;

b) gathering and focusing the arc light source to provide a focused beam;

c) providing an attenuator including a neutral density filter for passing a predetermined proportion of the focused beam;

d) spatially homogenizing the focused beam by imaging the light source onto a homogenizer input aperture to provide a homogenized beam;

e) splitting the homogenized beam into a first beam and a second beam;

f) detecting the first beam to provide a signal indicative of an intensity of the first beam; and g) focusing the second beam, which images the input aperture of the homogenizer, to illuminate a microscope slide for microscopic evaluations.

21. The method of claim 20 wherein a portion of the specimen is imaged by a detector wherein the portion of the specimen and an additional area surrounding the portion of the specimen is illuminated by the image of the output aperture.

* * * * *

UNITED STATES PATENT AND TRADEMARK OFFICE
CERTIFICATE OF CORRECTION

PATENT NO. : 5,677,762
DATED : October 14, 1997
INVENTOR(S) : Ortyn et al.

It is certified that error appears in the above-identified patent and that said Letters Patent is hereby corrected as shown below:

Column 1, line 46, delete the word "to".

Column 4, line 9, delete the word "elements" and replace it with -- the elements' --.

Column 5, line 49 - Column 6, line 17, delete the paragraph beginning with "The present invention. . . ." and ending with " ". . . . Cytology Scoring." "

Column 6, line 39, delete number "34" and replace it with -- 24 --.

Column 8, line 47, after the word "aperture" insert -- 41 --.

Column 9, line 20, delete the word "is".

Column 9, line 54, after number "40" delete "of the".

UNITED STATES PATENT AND TRADEMARK OFFICE
CERTIFICATE OF CORRECTION

PATENT NO. : 5,677,762
DATED : October 14, 1997
INVENTOR(S) : Ortyn et al.

It is certified that error appears in the above-identified patent and that said Letters Patent is hereby corrected as shown below:

Column 10, line 3, delete the word "in" and replace it with -- an --.

Column 11, line 37, after the word "output" insert -- 45 --.

Column 11, line 41, delete the word "an" and replace it with -- a --.

Signed and Sealed this

Sixteenth Day of February, 1999

Attest:

*Attesting Officer*            *Acting Commissioner of Patents and Trademarks*